United States Patent
Seetharaman et al.

(10) Patent No.: US 11,644,385 B2
(45) Date of Patent: May 9, 2023

(54) CONTROLLED TESTING ENVIRONMENT FOR AUTONOMOUS VEHICLE IN SIMULATED EVENT

(71) Applicant: GM Cruise Holdings LLC, San Francisco, CA (US)

(72) Inventors: Mahesh Seetharaman, Dublin, CA (US); Kevin Chu, San Francisco, CA (US); Dennis Jackson, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 468 days.

(21) Appl. No.: 16/836,299

(22) Filed: Mar. 31, 2020

(65) Prior Publication Data

US 2021/0302270 A1    Sep. 30, 2021

(51) Int. Cl.
  *G01M 17/00*   (2006.01)
  *G01M 17/007*  (2006.01)
  *G07C 5/08*    (2006.01)

(52) U.S. Cl.
  CPC ....... *G01M 17/0072* (2013.01); *G07C 5/0808* (2013.01)

(58) Field of Classification Search
  CPC .................... G01M 17/0072; G07C 5/0808
  See application file for complete search history.

(56) References Cited

U.S. PATENT DOCUMENTS

| | | | | |
|---|---|---|---|---|
| 3,633,412 A | * | 1/1972 | Pelta | G01L 17/00 73/132 |
| 5,447,060 A | * | 9/1995 | Smith | G01M 17/0072 73/116.06 |
| 6,516,287 B1 | * | 2/2003 | Freitag | G01M 17/0072 701/32.8 |
| 2002/0018982 A1 | * | 2/2002 | Conroy | G09B 19/16 434/62 |

FOREIGN PATENT DOCUMENTS

| | | | | |
|---|---|---|---|---|
| WO | WO-0120200 A1 | * | 3/2001 | ........... F16D 48/066 |
| WO | WO-02095204 A1 | * | 11/2002 | .............. F02B 37/04 |
| WO | WO-03074987 A1 | * | 9/2003 | ............. G01L 5/282 |
| WO | WO-2007031580 A1 | * | 3/2007 | ............ B60W 10/06 |
| WO | WO-2008080378 A1 | * | 7/2008 | ......... F02D 41/0225 |
| WO | WO-2009024268 A2 | * | 2/2009 | ........... F02D 35/024 |
| WO | WO-2009124831 A1 | * | 10/2009 | ........ F02D 41/0002 |

* cited by examiner

*Primary Examiner* — Joseph J Dallo
(74) *Attorney, Agent, or Firm* — Polsinelli PC

(57) ABSTRACT

A vehicle is received in a stationary controlled area of a controlled testing environment. Simulation inputs corresponding to a simulated scene are generated and transmitted to the vehicle. The vehicle applies torque in response. A vehicle control mechanism of the controlled testing environment, such as a chassis dynamometer, a motorized treadmill, or a lift, keeps the vehicle within the stationary controlled area during the test despite the torque applied by the vehicle. A path of the vehicle within the simulated scene is determined based on the applied torque, based upon which the vehicle's navigation system is calibrated.

20 Claims, 10 Drawing Sheets

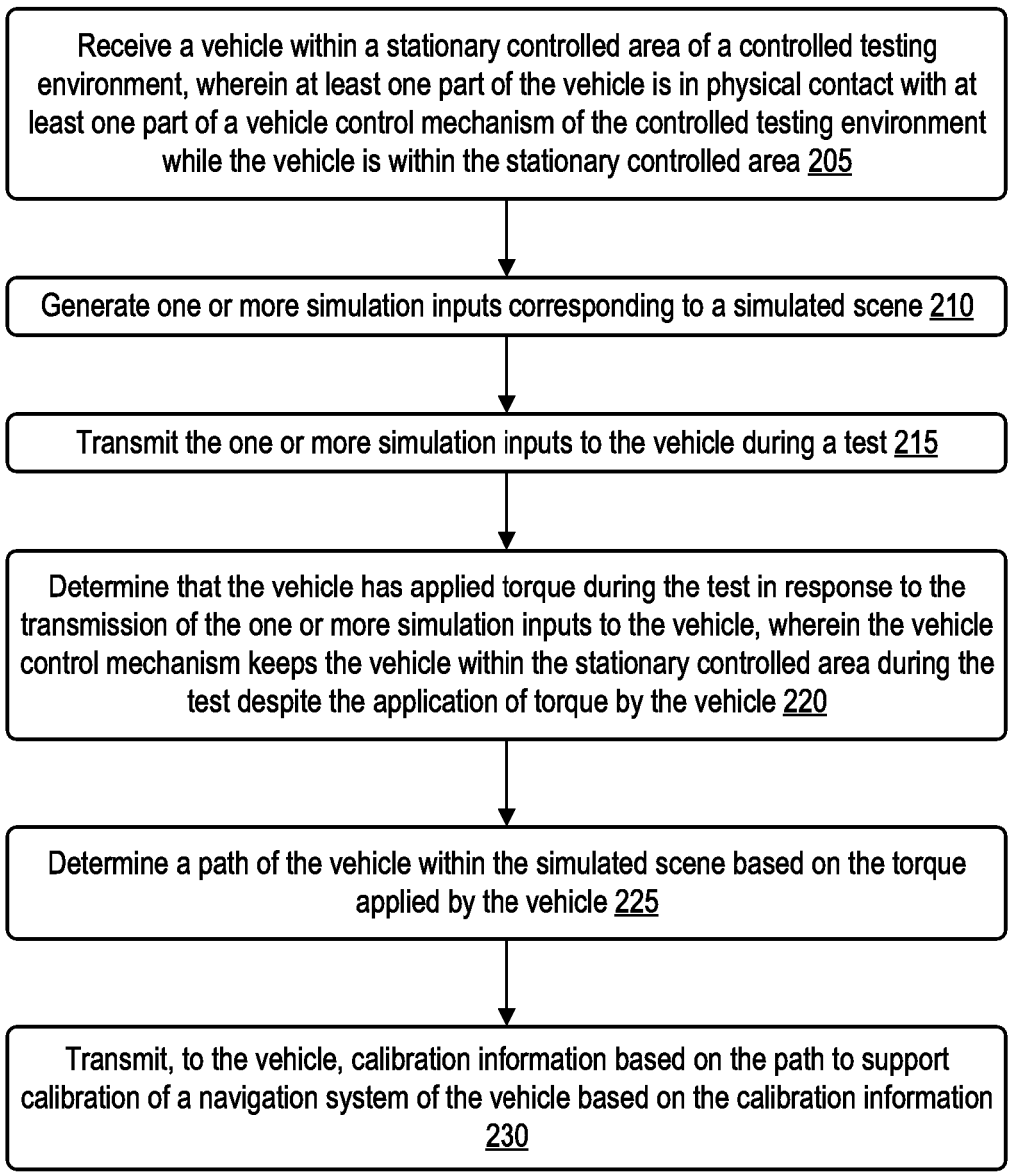

Propel the vehicle into a stationary controlled area of a controlled testing environment, wherein at least one part of the vehicle is in physical contact with at least one part of a vehicle control mechanism of the controlled testing environment while the vehicle is within the controlled area 255

Receive one or more simulation inputs corresponding to a simulated scene at the vehicle during a test 260

Apply torque at the vehicle during the test in response to receipt of the one or more simulation inputs, wherein the vehicle control mechanism keeps the vehicle within the stationary controlled area during the test despite the application of torque by the vehicle 265

Receive calibration information at the vehicle, the calibration information based on a path of the vehicle within the simulated scene as determined based on the torque applied by the vehicle 270

Calibrate a navigation system of the vehicle based on the calibration information 275

CONTROLLED TESTING ENVIRONMENT FOR AUTONOMOUS VEHICLE IN SIMULATED EVENT

TECHNICAL FIELD

The present technology generally pertains to testing of an autonomous vehicle using a simulation and a controlled testing environment. More specifically, the present technology pertains to testing of an autonomous vehicle by placing the autonomous vehicle in a controlled testing environment in which the vehicle is able to spin its wheels without moving in a dangerous way, and feeding simulated inputs to the autonomous vehicle while the autonomous vehicle is in the controlled testing environment.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others. The autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system Similar sensors may also be mounted onto non-autonomous vehicles, for example onto vehicles whose sensor data is used to generate or update street maps.

A wide range of manufacturing defects or discrepancies can exist in vehicles, such as motors, wheels, tires, batteries, alternators, steering assemblies, gears, and the like. Autonomous vehicles add additional potential defects or discrepancies, such as in various sensors, mounting hardware that affixes the sensors to the vehicles, software that calibrates the sensors, software that interprets data from the sensors, software that aids in navigating the vehicle through its environment, and so forth. Because of these discrepancies, different autonomous vehicles may capture slightly different data and react in slightly different ways to the same situations, even when the vehicles are brand new.

To ensure that an autonomous vehicle is safe to drive, thorough road testing is generally performed over an extended period of time, typically requiring at least one human operator present in the autonomous automobile at all times during testing to potentially intervene and prevent an accident if something unexpected happens. However, this sort of testing requires a lot of time and manpower.

Sometimes, a situation may happen on the road in which the vehicle reacted optimally or sub-optimally, but recreation of the exact conditions of that situation on the road to determine if the vehicle's training has changed its reaction in the same scenario may be effectively impossible. Additionally, some situations happen so infrequently on the road that, after years or even decades of testing, they might never happen on the road, meaning such situations will simply never end up being tested even if it would be beneficial to test them. Furthermore, some situations cannot be safely tested on the road without putting lives at risk, such as a situation in which a previously-undetected pedestrian or bicyclist suddenly appears directly in front of the autonomous vehicles while the autonomous vehicles is moving at a high speed, or a situation in which a particular combination of components of the vehicle fail simultaneously or in quick succession.

There is a technical need to be able to test autonomous vehicles in a variety of unusual and/or potentially dangerous situations without actually putting any human lives at risk or requiring a human operator to be present within the vehicle at all times.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2A illustrates operations for vehicle testing as performed by a vehicle testing system with a controlled testing environment;

FIG. 2B illustrates operations for vehicle testing as performed by the vehicle being tested;

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

A vehicle is received in a stationary controlled area of a controlled testing environment. Simulation inputs corresponding to a simulated scene are generated and transmitted to the vehicle. The vehicle applies torque in response. A vehicle control mechanism of the controlled testing environment, such as a chassis dynamometer, a motorized treadmill, or a lift, keeps the vehicle within the stationary controlled area during the test despite the torque applied by the vehicle. A path of the vehicle within the simulated scene is determined based on the applied torque, based upon which the vehicle's navigation system is calibrated.

The disclosed technologies address a need in the art for improvements to vehicle testing. Use of a simulation with a controlled testing environment allows for extensive testing of autonomous vehicles in situations that are unusual, infrequent, or potentially dangerous in the real world, while still allowing the vehicle's navigation and drivetrain systems to actually react to the simulation without any risk to the vehicle or any human beings. Use of a simulation with a controlled testing environment allows for a situation to be "replayed" multiple times so as to determine an optimal behavior in that situation. Testing autonomous vehicles in such situations and in a controlled testing environment allows for improved training of machine learning based navigation systems, calibration of these navigation systems, and validation to ensure the navigation systems perform as expected. Ultimately, this improves safety and performance of the autonomous vehicle in both ordinary and extraordinary situations, and reduces the probability of a situation in which the autonomous vehicle's navigation system does not know what action to take.

Figure 1:
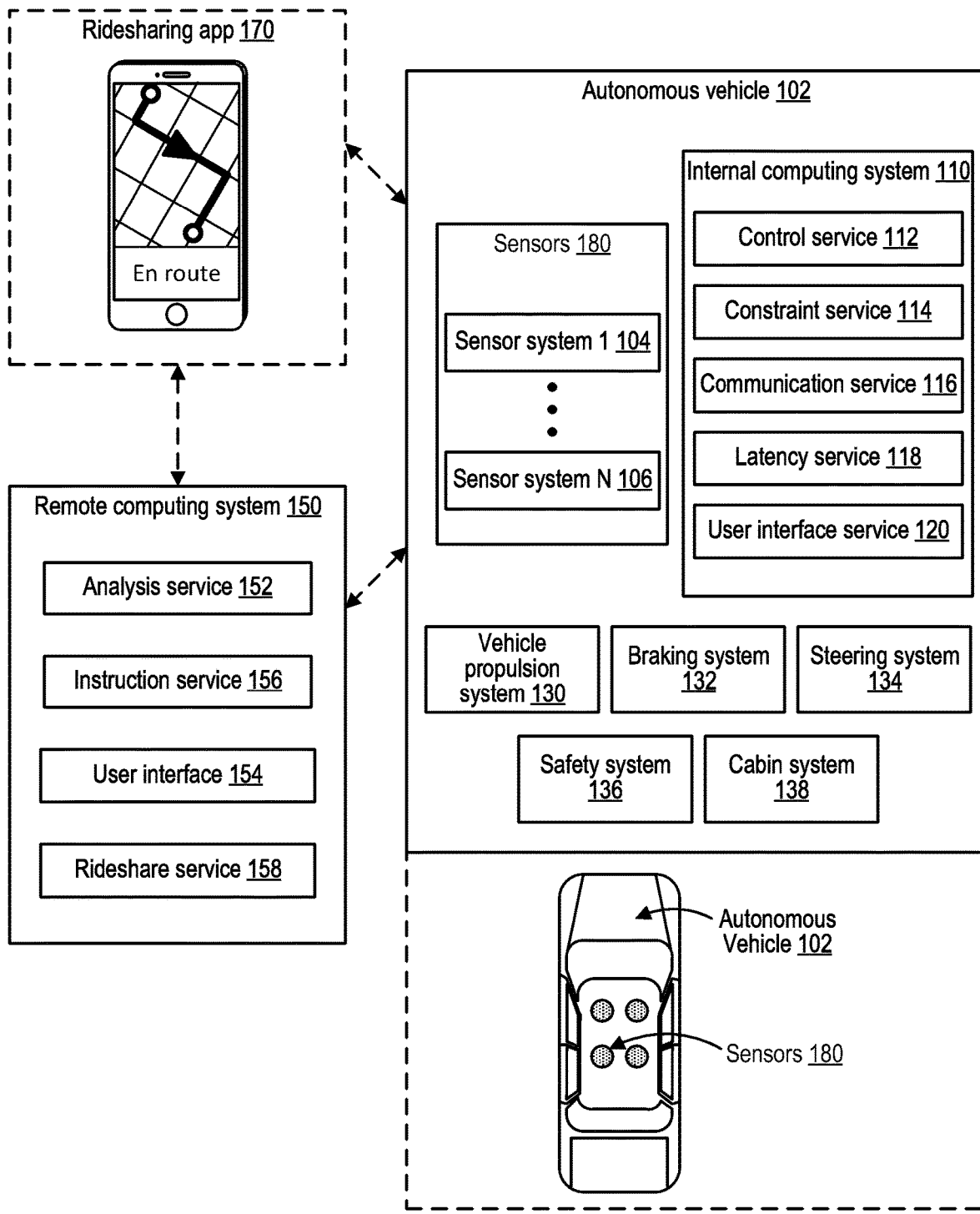
FIG. 1 illustrates an autonomous vehicle and remote computing system architecture.

FIG. 1 illustrates an autonomous vehicle and remote computing system architecture.

The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

Figure 9:
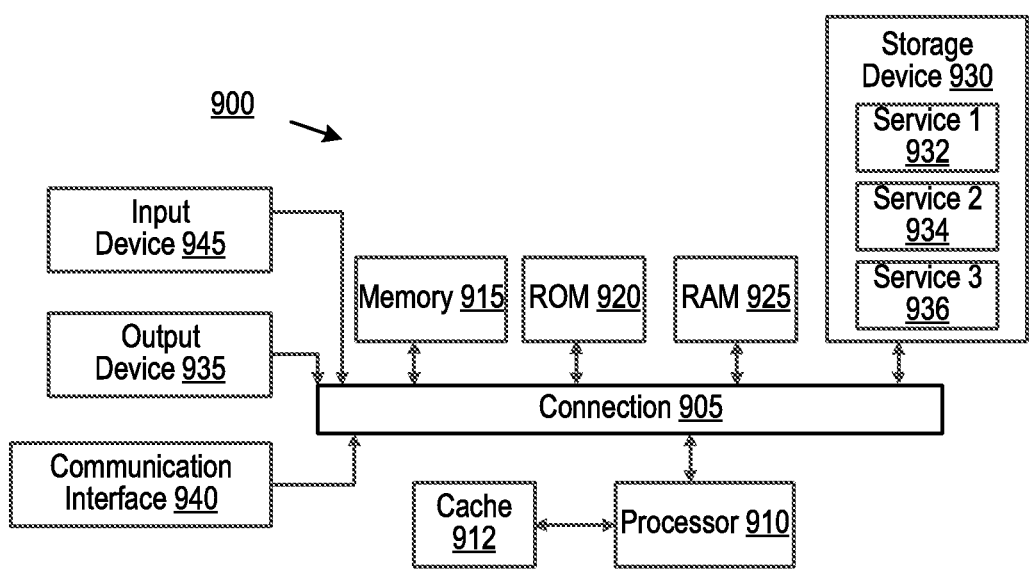
FIG. 9 shows an example of a system for implementing certain aspects of the present technology.

The internal computing system 110 can, in some cases, include at least one computing system 900 as illustrated in or discussed with respect to FIG. 9, or may include at least a subset of the components illustrated in FIG. 9 or discussed with respect to computing system 900.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

The remote computing system 150 can, in some cases, include at least one computing system 900 as illustrated in or discussed with respect to FIG. 9, or may include at least a subset of the components illustrated in FIG. 9 or discussed with respect to computing system 900.

FIG. 2A illustrates operations for vehicle testing as performed by a vehicle testing system with a controlled testing environment.

The operations 200 of FIG. 2A are performed by a vehicle testing system with a controlled testing environment. The vehicle testing system may include, in addition to the controlled testing environment, a computing system 900 that controls a vehicle control mechanism of the controlled testing environment.

At step 205, the vehicle testing system receives a vehicle within a stationary controlled area of its controlled testing environment. At least one part of the vehicle is in physical contact with at least one part of a vehicle control mechanism of the controlled testing environment while the vehicle is within the stationary controlled area.

At step 210, the vehicle testing system generates one or more simulation inputs corresponding to a simulated scene. At step 215, the vehicle testing system transmits the one or more simulation inputs to the vehicle during a test. At step 220, the vehicle testing system determines that the vehicle has applied torque during the test in response to the transmission of the one or more simulation inputs to the vehicle. The vehicle control mechanism keeps the vehicle within the stationary controlled area during the test despite the application of torque by the vehicle.

At step 225, the vehicle testing system determines a path of the vehicle within the simulated scene based on the torque applied by the vehicle. That is, the path that the vehicle would take based on the torque applied by the vehicle if the vehicle were truly in the simulated scene. At step 230, the vehicle testing system transmits calibration information based on the path to the vehicle to support calibration of a navigation system of the vehicle based on the calibration information.

In some cases, the vehicle control mechanism of the controlled testing environment includes a motorized treadmill 310, in which case the stationary controlled area is on top of a surface 320 the motorized treadmill 310. At least the wheels of the vehicle are in contact with at least the surface 320 of the motorized treadmill 310 while the vehicle is within the stationary controlled area. The motorized treadmill 310 keeps the vehicle within the stationary controlled area during the test despite the application of torque by the vehicle by moving the surface of the motorized treadmill to counteract propulsion of the vehicle through the application of the torque. For example, if the vehicle is propelling itself forward in response to receiving the simulation inputs, the surface of the motorized treadmill 310 may be moved backwards so that the vehicle remains relatively stationary, within the stationary controlled area atop the motorized treadmill 310.

In some cases, the vehicle control mechanism of the controlled testing environment includes a chassis dynamometer 410, in which case the stationary controlled area is on top of the chassis dynamometer 410. At least the wheels of the vehicle are in contact with at least the rollers of the chassis dynamometer while the vehicle is within the stationary controlled area. The chassis dynamometer 410 keeps the vehicle within the stationary controlled area during the test despite the application of torque by the vehicle by rotating one or more cylinders of the chassis dynamometer to counteract propulsion of the vehicle through the application of the torque. For example, if the vehicle is propelling itself forward in response to receiving the simulation inputs, the rollers of the chassis dynamometer 410 may be rotated backwards so that the vehicle remains relatively stationary, within the stationary controlled area atop the chassis dynamometer 410.

In some cases, the vehicle control mechanism of the controlled testing environment includes a lift 510 that lifts the vehicle above the ground, in which case the stationary controlled area is on top of the lift 510. At least a part of the chassis (not the wheels) of the vehicle is in contact with at least a portion of the lift 510 while the vehicle is within the stationary controlled area. The lift 510 keeps the vehicle within the stationary controlled area during the test despite the application of torque by the vehicle by preventing the wheels of the vehicle from touching the ground.

In some cases, the one or more simulation inputs include simulated sensor data corresponding to a particular sensor of the vehicle. For example, the one or more simulation inputs may include visual images from camera, heat maps or images from infrared (IR) sensor or camera, distance measurement point clouds from a radio detection and ranging (RADAR) sensor, distance measurement point clouds from a light detection and ranging (LIDAR) sensor, location data from a global positioning system (GPS) receiver, location data from another type of global navigation satellite system (GNSS) receiver, kinematic data from an inertial measurement unit (IMU), acceleration data from an accelerometer, rotational data from a gyroscope, directional data from a compass, or some combination thereof. In some cases, the one or more simulation inputs include one or more two-dimensional or three-dimensional representations of the simulated scene, such as representations that the vehicle might ordinarily generate on its own from its sensor data.

In some cases, the vehicle testing system determines that the path is an optimal path. In such a case, the calibration information supports calibration of the navigation system of the vehicle by encouraging navigation corresponding to the path in a situation matching to the simulated scene. If the navigational system uses a machine learning algorithm, calibrating the navigation system may include training a machine learning model of the machine learning algorithm by feeding in training data corresponding to use of the path as an optimal response to a situation (the simulated scene) characterized by the simulation inputs. The navigational system is then more likely to recommend the path, or a similar course of action, if it sees the simulated inputs, or a similar pattern of inputs, in the course of driving in the future.

In some cases, the vehicle testing system determines that the path is a sub-optimal path. In such a case, the calibration information supports calibration of the navigation system of the vehicle by discouraging navigation corresponding to the path in a situation matching to the simulated scene. If the navigational system uses a machine learning algorithm, calibrating the navigation system may include training a machine learning model of the machine learning algorithm by feeding in training data corresponding to use of the path as a sub-optimal response to a situation (the simulated scene) characterized by the simulation inputs. The navigational system is then less likely to recommend the path, or a similar course of action, if it sees the simulated inputs, or a similar pattern of inputs, in the course of driving in the future.

In some cases, the vehicle testing system generates a second set of one or more simulation inputs corresponding to the simulated scene based on the torque applied by the vehicle. For instance, if the torque applied by the vehicle is meant to would ordinarily propel the vehicle forward (if not for the vehicle control mechanism), the second set of one or more simulation inputs may correspond to the vehicle having moved forward within the simulated scene by a distance corresponding to the torque applied by the vehicle. The vehicle testing system then transmits the second set of one or more simulation inputs to the vehicle during the test. The vehicle receives the second set of one or more simulation inputs and applies a second torque in response, and the vehicle testing system determines that the vehicle has applied the second torque. The path determined at step 225 is, in this case, based on the torque determined at step 220 as well as this second torque.

Determining the torque applied by the vehicle may be performed by components of the vehicle testing system. For instance, if the vehicle control mechanism is a chassis dynamometer 410, the chassis dynamometer 410 may include sensors that identify forces applied by the vehicle to the rollers, which may then identify the torque applied by the vehicle. Alternately, the vehicle testing system may determine the torque applied by the vehicle by receiving outputs from the vehicle that the vehicle transmits (e.g., wirelessly) to the vehicle testing system.

The stationary controlled area is a stationary area, in that the area does not move or change. For instance, if the vehicle control mechanism is the motorized treadmill 310, an area on the surface 320 of the motorized treadmill 310 is the stationary controlled area, and the vehicle is kept in that area during the test. The stationary controlled area does not move during the test. The stationary controlled area may be the size of the vehicle, or may be larger than the vehicle by a predetermined amount N. The stationary controlled area may be the size of an area corresponding to the size of a part of the vehicle control mechanism (such as the size of the surface 320 of the motorized treadmill 310 or a size of the chassis dynamometer 410 or a size of the lift 510) or may be larger than the vehicle by a predetermined amount N. The predetermined amount N may be, for example, 1 foot, 2 feet, 3 feet, 4 feet, 5 feet, 6 feet, 7 feet, 8 feet, 9 feet, 10 feet, a number of feet exceeding 10 feet, or a number of feet in between any two listed numbers. The predetermined amount N may be, for example, 1 meter, 2 meters, 3 meters, 4 meters, 5 meters, 6 meters, 7 meters, 8 meters, 9 meters, 10 meters, a number of meters exceeding 10 meters, or a number of meters in between any two listed numbers.

FIG. 2B illustrates operations for vehicle testing as performed by the vehicle being tested.

The operations 250 of FIG. 2B are performed by a vehicle interacting with the vehicle testing system discussed with respect to FIG. 2A. The vehicle may be the autonomous vehicle 102 of FIG. 1, the vehicle 360 of FIGS. 3A-5B, another vehicle, or some combination thereof.

At step 255, the vehicle's systems propel the vehicle into the stationary controlled area of the controlled testing environment of the vehicle testing system discussed with respect to step 205 of FIG. 2A. At least one part of the vehicle is in physical contact with at least one part of the vehicle control mechanism of the controlled testing environment while the vehicle is within the controlled area.

At step 260, the vehicle's systems receive the one or more simulation inputs corresponding to the simulated scene during the test, in response to the one or more simulation inputs being generated and transmitted at steps 210 and 215. At step 265, in response to receipt of the one or more simulation inputs and during the test, the vehicle's systems apply torque. The vehicle remains within the stationary controlled area during the test despite the application of torque by the vehicle, since the vehicle control mechanism keeps the vehicle within the stationary controlled area during the test.

At step 270, the vehicle's systems receive the calibration information transmitted at step 230. The calibration information is based on a path of the vehicle within the simulated scene as determined at step 225 based on the torque applied by the vehicle. At step 275, the vehicle's systems calibrate the navigation system of the vehicle based on the calibration information. The navigation system may be the system that navigates the autonomous vehicle autonomously.

Figure 3A:
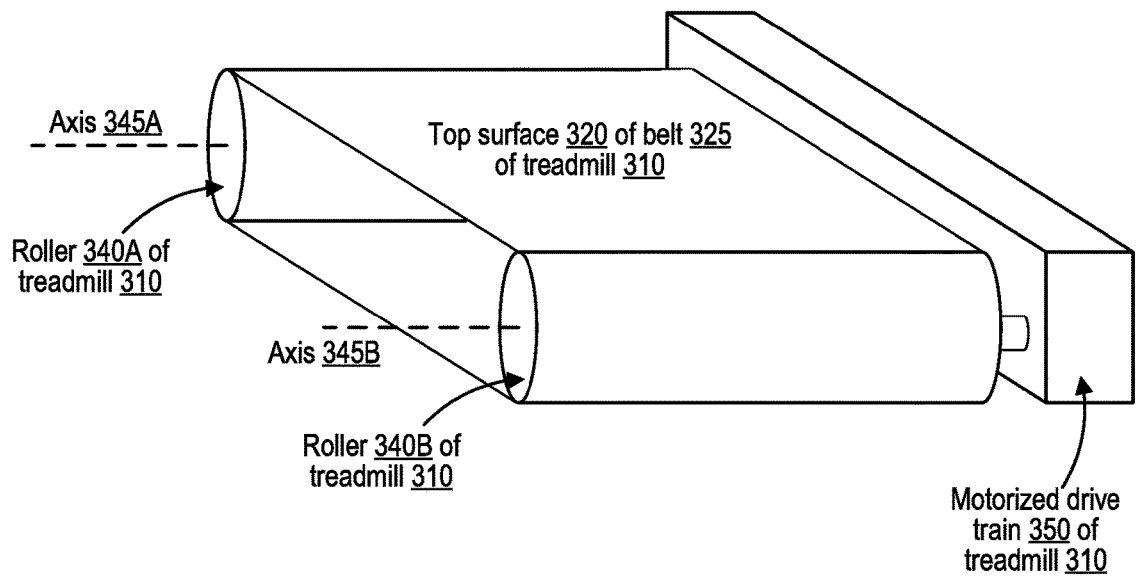
FIG. 3A illustrates a motorized vehicle treadmill of a controlled testing environment.

FIG. 3A illustrates a motorized vehicle treadmill of a controlled testing environment.

The motorized treadmill 310 of FIG. 3A includes a motorized drive train 350 with motors that rotate two or more rollers 340 about axes 345. In particular, the motorized drive train 350 rotates a first roller 340A about a first axis 345A, and rotates a second roller 340B about a second axis 345B. The first axis 345A is parallel to the second axis 345B. A belt 325 is wrapped around the first roller 340A and the second roller 340B, so that rotation of the first roller 340A and the second roller 340B drives the belt 325 around the first roller 340A and the second roller 340B. A top surface 320 of the belt 325 therefore can move forwards or backward (e.g., perpendicular to the axes 345A and 345B) depending on whether the first roller 340A and the second roller 340B are rotated clockwise or counter-clockwise about the axes 345A and 345B.

Figure 3B:
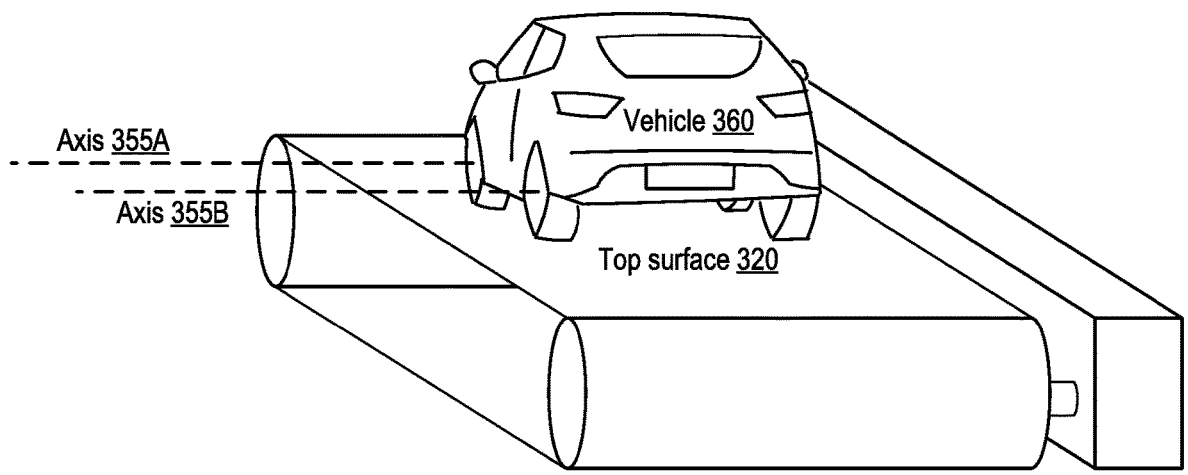
FIG. 3B illustrates a vehicle using the motorized vehicle treadmill of FIG. 3A.

FIG. 3B illustrates a vehicle using the motorized vehicle treadmill of FIG. 3A.

In particular, a vehicle 360 is illustrated on top of the top surface 320 of the motorized treadmill 310. The top surface 320, or at least a portion of it, may be the stationary controlled area of the controlled testing environment if the vehicle control mechanism includes the motorized treadmill 310. If the vehicle 360 is applying torque to rotate its wheels about the axes 355A and 355B (which may be parallel to the axes 345A and 345B) to propel itself forward, the motorized treadmill 310 may keep the vehicle 360 relatively stationary (i.e., within the stationary controlled area atop the top surface 320) by rotating its belt 325 so as to move its top surface 320 backwards at a rate that counteracts the forward propulsion of the vehicle 360. This prevents the vehicle 360 from incurring damage during a simulation, while still allowing the vehicle to test its hardware in addition to its software to calibrate its systems and/or ensure that all systems are reacting optimally or otherwise as expected.

The vehicle 360 may be a particular embodiment of the autonomous vehicle 102 of FIG. 1, and may include the sensors 180, internal computing system 110, and/or other components discussed with respect to the autonomous vehicle 102 of FIG. 1. Alternately, the vehicle 360 may be a different type of vehicle, autonomous or otherwise, but may still include may include the sensors 180, internal computing system 110, and/or other components discussed with respect to the autonomous vehicle 102 of FIG. 1 and/or the computing device 900 of FIG. 9.

Figure 4A:
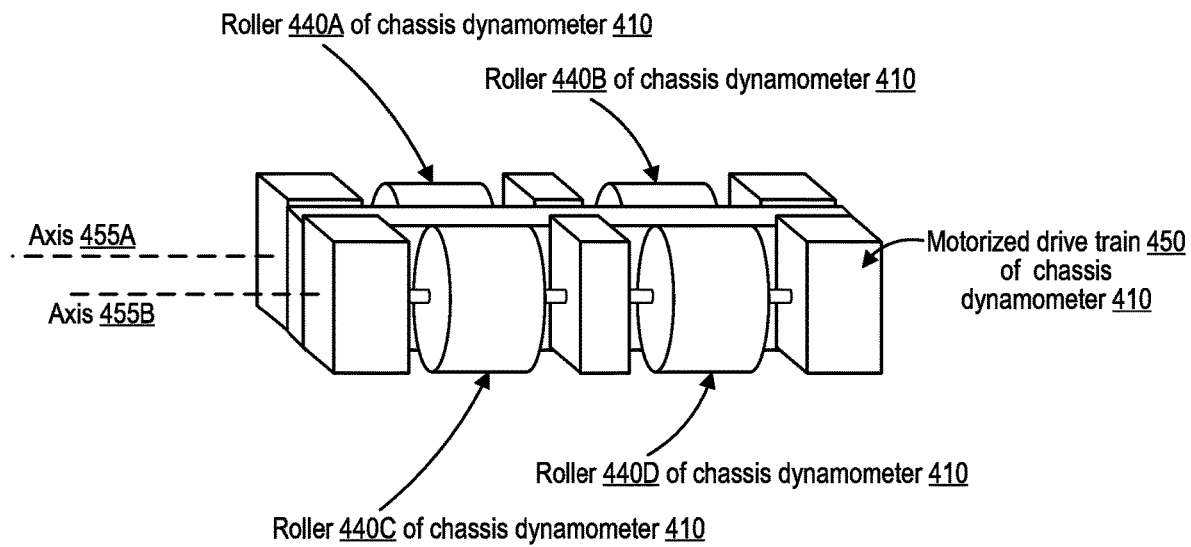
FIG. 4A illustrates a chassis dynamometer of a controlled testing environment.

FIG. 4A illustrates a chassis dynamometer of a controlled testing environment.

The chassis dynamometer 410 of FIG. 4A includes a motorized drive train 450 with motors that rotate two or more rollers 440 about axes 445. In particular, the motorized drive train 450 rotates a first roller 440A about a first axis 445A, rotates a second roller 440B about the first axis 445A, rotates a third roller 440C about a second axis 455B, and rotates a fourth roller 440D about the second axis 455B. The first axis 445A is parallel to the second axis 445B.

Figure 4B:
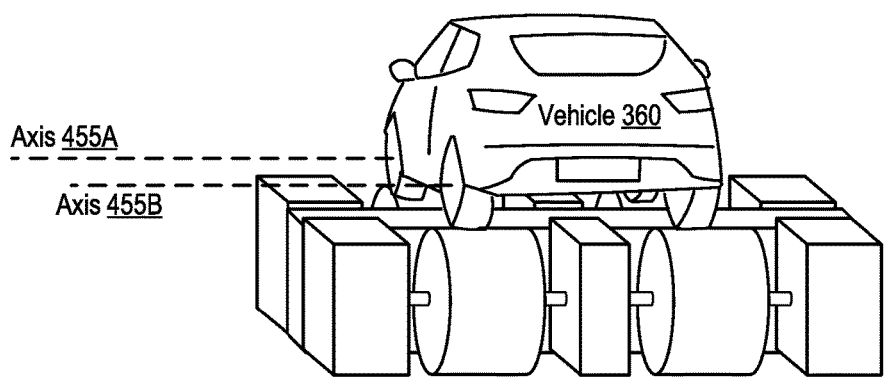
FIG. 4B illustrates a vehicle using the chassis dynamometer of FIG. 4A.

FIG. 4B illustrates a vehicle using the chassis dynamometer of FIG. 4A.

In particular, a vehicle 360 is illustrated on top of the chassis dynamometer 410. The top of the chassis dynamometer 410, or at least a portion of the top of the chassis dynamometer 410 and/or an area around the chassis dynamometer 410, may be the stationary controlled area of the controlled testing environment if the vehicle control mechanism includes the chassis dynamometer 410. The wheels of the vehicle 360 may be in contact with (e.g., resting on top of) the rollers 440A-D of the chassis dynamometer 410 while the vehicle is within the stationary controlled area atop the chassis dynamometer 410. If the vehicle 360 is applying torque to rotate its wheels about the axes 455A and 455B (which may be parallel to the axes 445A and 445B) to propel itself forward, the chassis dynamometer 410 may keep the vehicle 360 relatively stationary (i.e., within the stationary controlled area atop the top chassis dynamometer 410) by rotating at least a subset of its rollers 440A-D in the opposite direction about the axes 455A and 455B. For instance, if the vehicle rotates its wheels clockwise, the chassis dynamometer 410 rotates its rollers counter-clockwise, and vice versa.

The chassis dynamometer 410 need not always rotate all of its rollers 440A-D. If the vehicle 360 is a front-wheel drive vehicle, the chassis dynamometer 410 may only need to rotate the rollers that the vehicle 360's front wheels rest on, which are the rollers 440A and 440B as illustrated in FIGS. 4A and 4B. If the vehicle 360 is a rear-wheel drive vehicle, the chassis dynamometer 410 may only need to rotate the rollers that the vehicle 360's rear wheels rest on, which are the rollers 440C and 440D as illustrated in FIGS. 4A and 4B. If the vehicle 360 is an all-wheel drive or 4-wheel drive vehicle, the chassis dynamometer 410 may need to rotate all four rollers 440A-D.

The chassis dynamometer 410 may include sensors that measure the torque or and/or other rotational or directional forces applied by the wheels of the vehicle 360 to each of the rollers 440. In this way, the chassis dynamometer 410 may be the source of the torque determination of step 220.

Figure 5A:
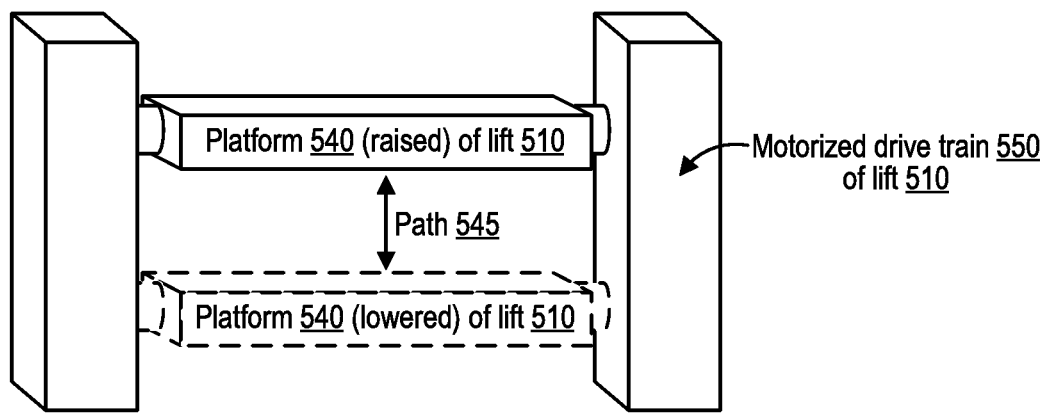
FIG. 5A illustrates a vehicle lift of a controlled testing environment.

FIG. 5A illustrates a vehicle lift of a controlled testing environment.

The lift 510 of FIG. 5A may be motorized and includes a motorized drive train 550 with motors that raise and lower a platform 540 along a path 545. The platform 540 is illustrated in a raised position with a solid outline, and in a lowered position with a dashed outline in a lowered position.

Figure 5B:
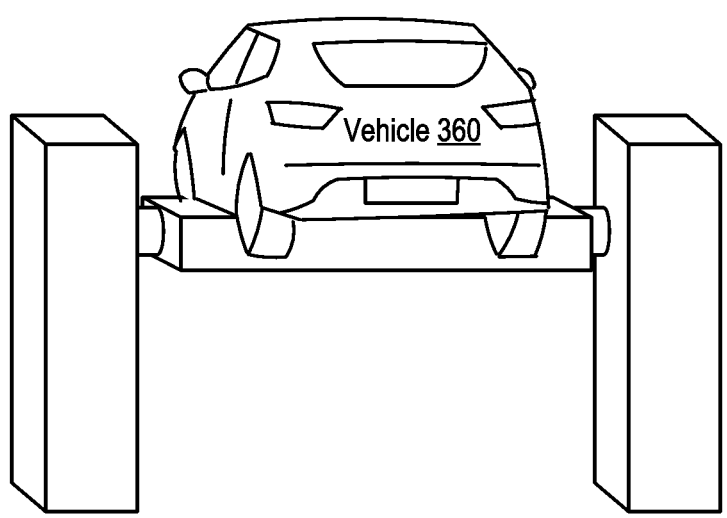
FIG. 5B illustrates a vehicle using the vehicle lift of FIG. 5A.

FIG. 5B illustrates a vehicle using the vehicle lift of FIG. 5A.

In particular, a vehicle 360 is illustrated on top of the platform 540 of the lift 510 while the platform 540 is in its raised position. The top of the platform 540, and/or an area around the platform 540, may be the stationary controlled area of the controlled testing environment if the vehicle control mechanism includes the lift 510. If the vehicle 360 is applying torque to rotate its wheels, the lift 510 may keep the vehicle 360 relatively stationary (i.e., within the stationary controlled area atop the raised platform 540) because the raising of the platform 540 lifts the wheels of the vehicle 360 off of the ground.

Figure 6:
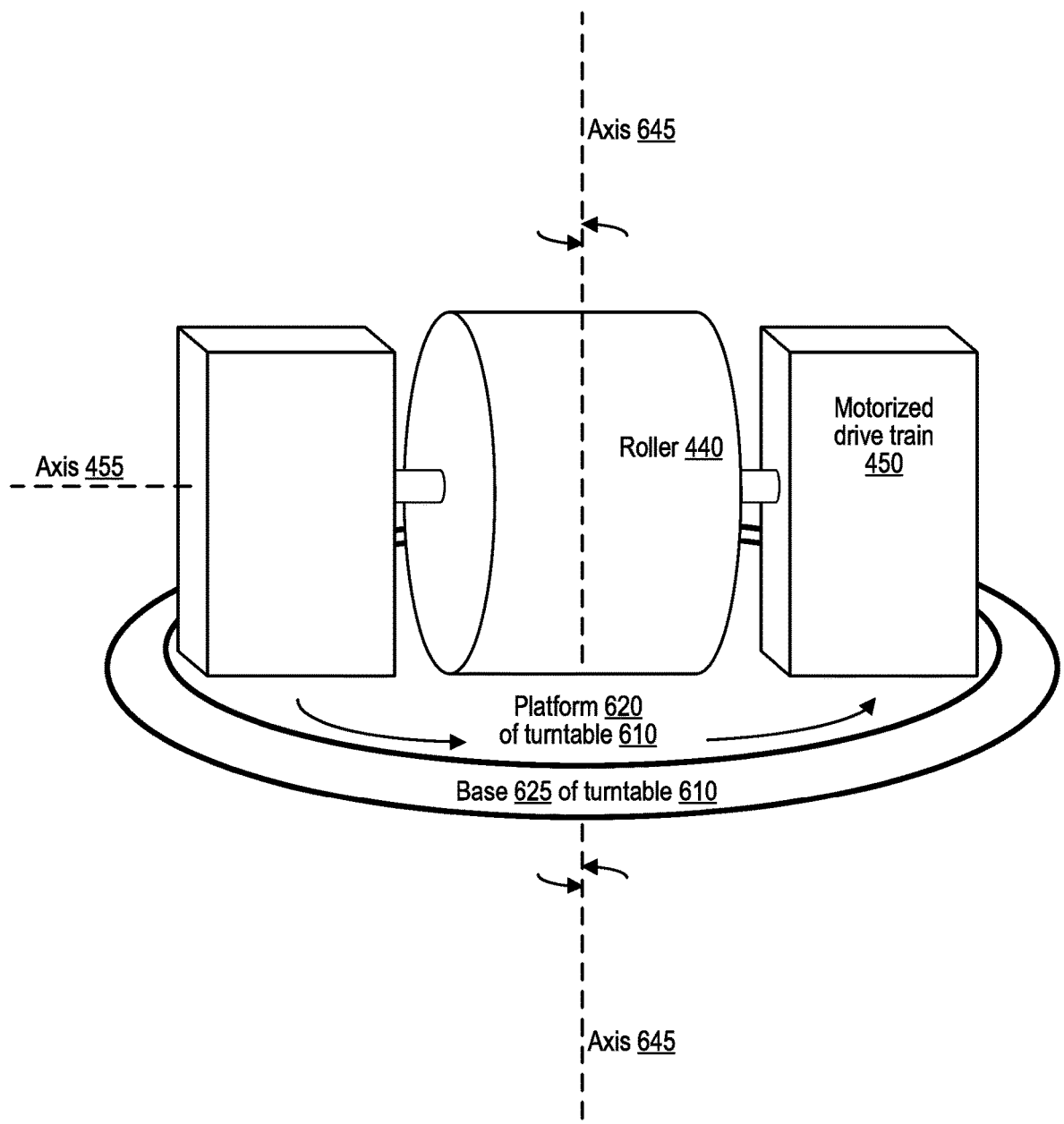
FIG. 6 illustrates a turntable for rotating a roller of the chassis dynamometer of FIG. 4A to enable a vehicle to turn its wheels to either side as if to turn the vehicle.

FIG. 6 illustrates a turntable for rotating a roller of the chassis dynamometer of FIG. 4A to enable a vehicle to turn its wheels to either side as if to turn the vehicle.

In particular, a single roller 440 with a corresponding motorized drive train 450 to drive rotation of the roller 440 about the axis 455 of the chassis dynamometer 410 is illustrated. The roller 440 and motorized drive train 450 are coupled atop a platform 620 of a turntable 610 in FIG. 6. The platform 620 of the turntable 610 may rotate about the base 625 of the turntable 610 about an axis 645. The axis 645 is perpendicular to the axis 455.

Coupling the roller 440 and motorized drive train 450 to the platform 620 of the turntable 610 allows the vehicle to turn its wheels left and right to simulate performing a turn with the vehicle. In some cases, each of the rollers 440A-D of the chassis dynamometer 410 may each be coupled to a turntable 610 to allow such freedom of movement. In some cases, only the front rollers 440A-B of the chassis dynamometer 410 may each be coupled to a turntable 610. In some cases, only the rear rollers 440C-D of the chassis dynamometer 410 may each be coupled to a turntable 610. The turntable 610 may be motorized so that a motor drives rotation of the platform 620 about the base 625 about the axis 645. While the platform 620 is illustrated rotating about the base 625 counter-clockwise to correspond to the vehicle 360 rotating its wheels counter-clockwise (e.g., to turn the vehicle 360 to the left if the wheels being rotated are front wheels and the vehicle 360 is moving forward), the platform 620 may instead or additionally be rotated about the base 625 clockwise to correspond to the vehicle 360 rotating its wheels clockwise (e.g., to turn the vehicle 360 to the right if the wheels being rotated are front wheels and the vehicle 360 is moving forward). The turntable 610 may be passive, so that rotation of the wheel of the vehicle 360 about the axis 645 (corresponding to the vehicle performing a turn in the simulation) provides the rotational force that rotates the platform 620 about the base 625 about the axis 645, rather than (or in addition to) a motor providing the rotational force. The roller may have guide rails on either side (not pictured) to keep the wheel on the roller and to allow the force of the wheel rotating about the axis 645 to rotates the platform 620 about the base 625 about the axis 645.

In some cases, navigation and/or steering controls of the vehicle 360 (that correspond to the application of torque by the vehicle as in steps 220 and 265 of processes 200 and 250) may be fed into the turntable 610 and/or drive train 450 of the chassis dynamometer 410 to synchronize rotation of the platform 620 of the turntable 610 about the base 625 (and/or rotation of the roller 440) with the navigation and/or steering controls of the vehicle 360 (and/or the application of torque by the vehicle that the navigation and/or steering controls correspond to). In some cases, the simulation input(s) that are generated and fed to the vehicle 360 at steps 210 and 215 and 260 of the processes 200 and 250 may also be fed into the turntable 610 and/or drive train 450 of the chassis dynamometer 410 to synchronize rotation of the platform 620 of the turntable 610 about the base 625 (and/or rotation of the roller 440) with the navigation and/or steering controls of the vehicle 360 (and/or the application of torque by the vehicle that the navigation and/or steering controls correspond to). These simulation inputs may include any combination of the types of inputs 805, 810, 815, and/or 820 of the process 800.

Figure 7:
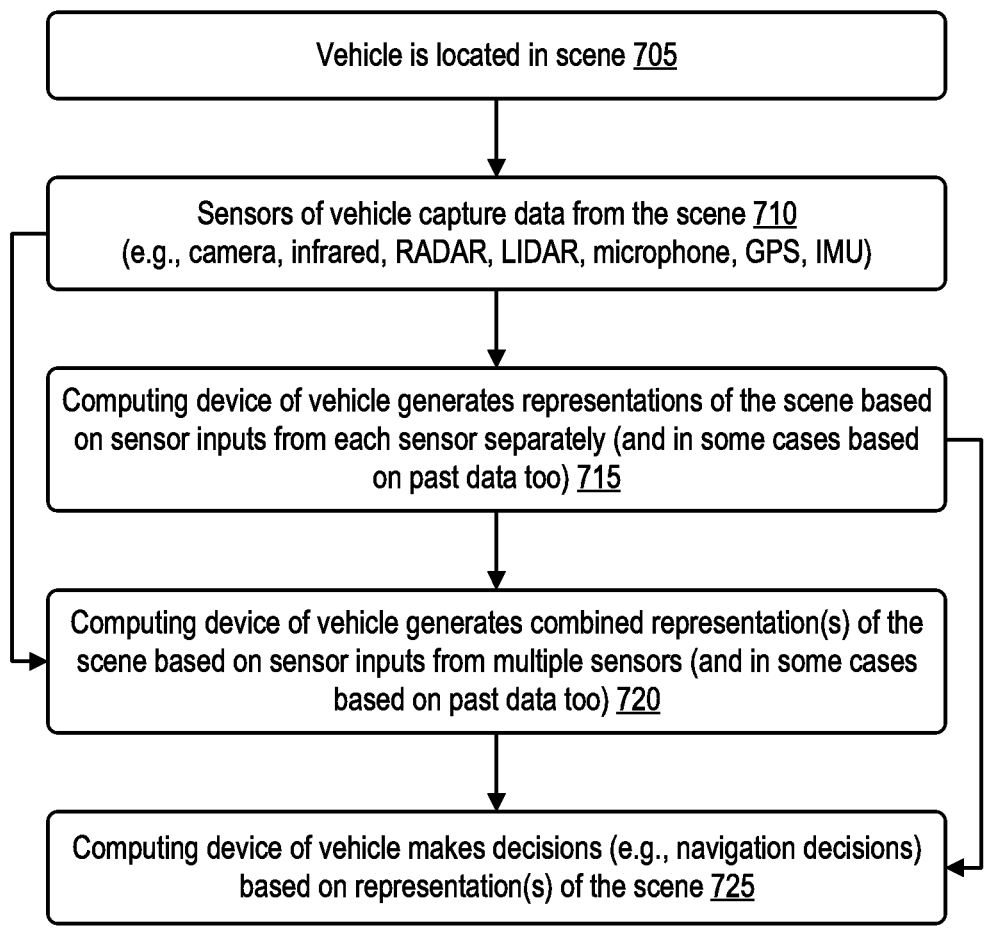
FIG. 7 illustrates operations by which a vehicle gathers information and makes informed navigation decisions.

FIG. 7 illustrates operations by which a vehicle gathers information and makes informed navigation decisions.

The operations 700 of FIG. 7A are performed by systems of a vehicle, such as the autonomous vehicle 102 or the vehicle 360.

Under real life driving conditions, at step 705, an autonomous vehicle is located in a scene. At a step 710, sensors 180 of the vehicle capture data from the scene. For instance, a camera of the vehicle may capture visual data, and IR sensor may capture IR data, a RADAR sensor may capture distance measurements, a LIDAR sensor may capture distance measurements, a microphone may capture audio, a GPS/GNSS receiver may capture location data, an IMU may capture kinetic data, or some combination thereof.

At step 715, the vehicle may generate representations of the scene based on the sensor inputs of each sensor individually. For instance, the vehicle may generate a visual representation of the scene based on the images captured by the camera at step 710. The vehicle may generate a 3D point cloud (or other 3D representation) based on the distance measurements captured by RADAR and/or LIDAR. In some cases, the vehicle may also use past data, for instance past point cloud data shifted over by a distance (e.g., 1 foot) in a particular direction if the vehicle knows that it has moved by that distance (e.g., 1 foot) in that particular direction.

At step 720, the vehicle may generate combined representations of the scene based on sensor inputs from multiple sensors. For instance, the vehicle may merge LIDAR and RADAR point clouds, and may merge visual data with point cloud data to generate a visually textured 3D representation of the scene, and so forth. In some cases, the vehicle may skip step 715 and immediately go from step 710 to step 720.

At step 725, the computing device of the vehicle makes one or more decisions, such as navigation decisions, based on the representations of the scene generated at step 715 and/or at step 720. For instance, if the representations of the scene indicate an obstacle ahead of the vehicle, the vehicle may make a decision to slow down and/or stop before the vehicle collides with the obstacle, or to swerve around the obstacle. In some cases, step 720 may be skipped, and the representations of the scene generated at step 715 may be used to make the decision(s) at step 725.

Figure 8:
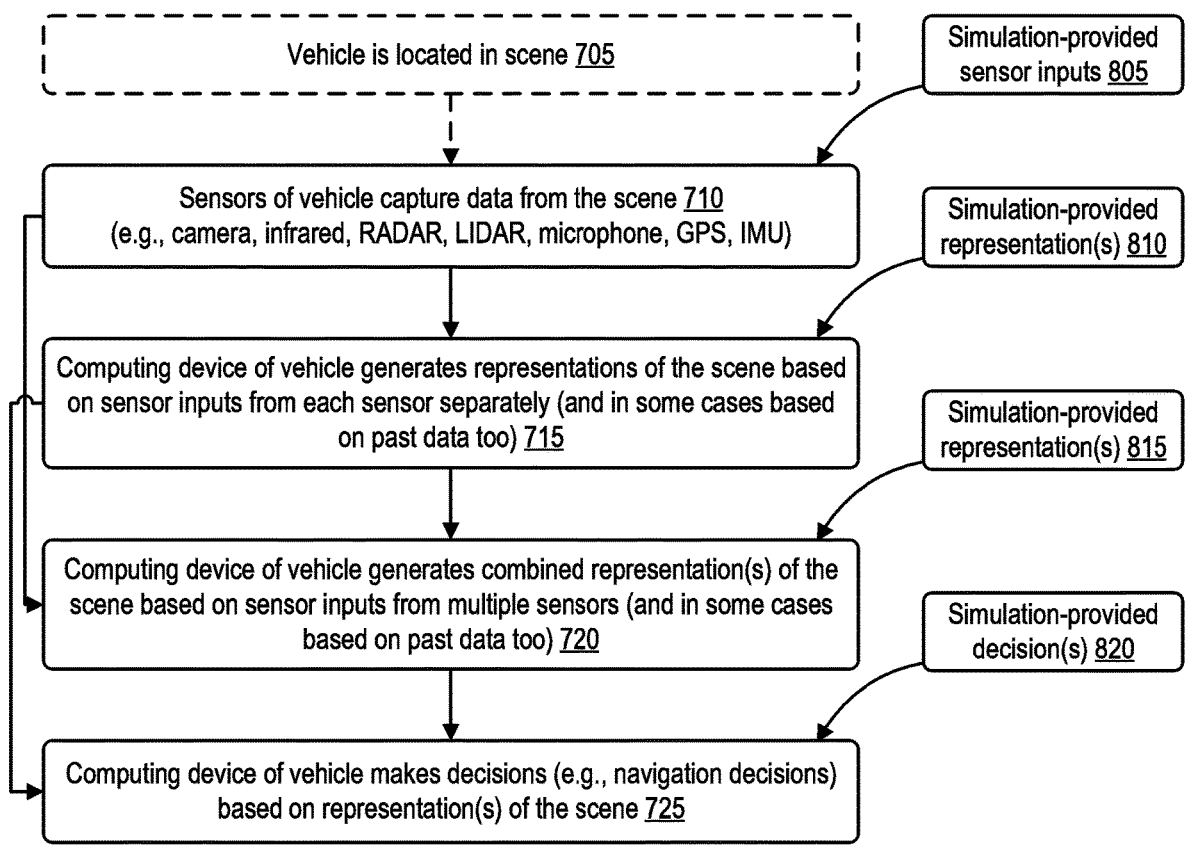
FIG. 8 illustrates the operations of FIG. 7 as augmented in a simulation.

FIG. 8 illustrates the operations of FIG. 7 as augmented in a simulation.

The process 800 of FIG. 8 includes the process 700 of FIG. 7 as augmented by the vehicle being fed simulated inputs corresponding to a simulated scene by a simulation computing system. As before, at step 705, the vehicle is still located in a real-life scene; however the real-life scene may in some cases be completely or partially ignored in favor of simulated inputs.

At step 710, the sensors of the vehicle capture data from the scene. At step 805, simulation-provided sensor inputs may be generated and/or transmitted to the vehicle at or just downstream of the sensors to simulate the sensors receiving particular inputs corresponding to the simulated scene. If the simulation is a simulated "replay" of a real-life scene, these simulation-provided sensor inputs may be real sensor inputs that were gathered by the vehicle (or by a different vehicle with a similar sensor array 180) in the past when that real-life scene took place.

At step 715, the vehicle generates the representations of the scene based on sensor inputs from specific sensors. At step 810, simulation-provided representation(s) may be generated and/or transmitted to the vehicle so that the vehicle treats these simulation-provided representation(s) as if the vehicle itself had generated these simulation-provided representation(s) at step 715 based on its own sensor inputs that it received at step 710.

At step 720, the vehicle generates the combined representations of the scene based on sensor inputs from multiple sensors, either by combining representations generated at step 715 or by generating the representations already combined immediately from the sensor inputs captured at step 710. At step 815, simulation-provided representation(s) may be generated and/or transmitted to the vehicle so that the vehicle treats these simulation-provided representation(s) as if the vehicle itself had generated these simulation-provided representation(s) at step 720 based on its own sensor inputs that it received at step 710 and/or its individual-sensor-based representation(s) that it generated at step 715.

At step 725, the vehicle makes its decisions based on the representation(s) of the scene(s) from step 715 and/or step 720. At step 820, simulation-provided decision(s) may be generated and/or transmitted to the vehicle so that the vehicle treats these simulation-provided decision(s) as if the vehicle itself had generated these simulation-provided decision(s) at step 725.

The simulation computing system may be any type of computing system 900, and may be part of the vehicle testing system discussed with respect to FIGS. 2A and 2B, which may also control the vehicle control mechanism. The simulation-provided sensor inputs 805, simulation-provided representation(s) 810, simulation-provided representation(s) 815, and simulation-provided decision(s) 820 are all examples of the one or more simulation inputs generated and transmitted at steps 210 and 215 of FIG. 2A and received at step 260 of FIG. 2B. In any given simulation, one or more of these types of simulation inputs may be generated and transmitted to the vehicle. For instance, a "low-level" simulation may provide only the simulation-provided sensor inputs 805, and in doing so may rest the vehicle's ability to perform steps 710-725 accurately. On the other hand, a more "high-level" simulation may provide the simulation-provided representation(s) 810, the simulation-provided representation(s) 815, and/or the simulation-provided decision(s) 820, which may be easier, faster, and more efficient to generate than the simulation-provided sensor inputs 805. In some cases, a simulation may transition from "low level" to "high level" or vice versa—for instance, a "replay" simulation may start with simulation-provided sensor inputs 805 that are actual sensor inputs gathered in the past. If the vehicle in the simulation performs a different action than the vehicle in the past performed, however, the simulation computing system may no longer have corresponding sensor inputs from the "replay data" and may transition to more "high level" simulation-provided representation(s) 810/815 that are less computationally costly for the simulation computing system to generate.

While various flow diagrams provided and described above, such as the flow diagrams of FIGS. 2A, 2B, 7, and 8, may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 900 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

FIG. 9 shows an example of a system for implementing certain aspects of the present technology. In particular, FIG. 9 shows an example of computing system 900, which can be for example any computing device making up internal computing system 110, remote computing system 150, (potential) passenger device executing rideshare app 170, a computing system associated with vehicle testing, a computing system controlling the controlled testing environment, a computing system controlling the motorized treadmill 310, computing system controlling the chassis dynamometer 410, computing system controlling the lift 510, a computing system performing any of the processes 200/250/700/800, any component thereof in which the components of the system are in communication with each other using connection 905, or any combination thereof. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A method of vehicle testing, the method comprising:
receiving a vehicle within a stationary controlled area of a controlled testing environment, wherein at least one part of the vehicle is in physical contact with at least one part of a vehicle control mechanism of the controlled testing environment while the vehicle is within the stationary controlled area;
generating one or more simulation inputs corresponding to a simulated scene;
transmitting the one or more simulation inputs to the vehicle during a test;
determining that the vehicle has applied torque during the test in response to the transmission of the one or more simulation inputs to the vehicle, wherein the vehicle control mechanism keeps the vehicle within the stationary controlled area during the test despite the application of torque by the vehicle;
determining a path of the vehicle within the simulated scene based on the torque applied by the vehicle during the simulated scene; and
transmitting calibration information based on the path to the vehicle to support calibration of a navigation system of the vehicle based on the calibration information.

2. The method of claim 1, wherein the vehicle control mechanism of the controlled testing environment includes a motorized treadmill, wherein the stationary controlled area is on top of a surface the motorized treadmill, wherein the motorized treadmill keeps the vehicle within the stationary controlled area during the test despite the application of torque by the vehicle by moving the surface of the motorized treadmill to counteract propulsion of the vehicle through the application of the torque.

3. The method of claim 1, wherein the vehicle control mechanism of the controlled testing environment includes a chassis dynamometer, wherein the stationary controlled area is on top of the chassis dynamometer, wherein the chassis dynamometer keeps the vehicle within the stationary controlled area during the test despite the application of torque by the vehicle by rotating one or more cylinders of the chassis dynamometer to counteract propulsion of the vehicle through the application of the torque.

4. The method of claim 3, wherein the chassis dynamometer includes a roller that is in contact with a wheel of the vehicle, wherein the wherein the torque rotates the wheel in a first rotational direction about a first axis during the test, wherein the roller rotates in a second rotational direction about a second axis during the test to counteract rotation of the wheel, the first axis parallel to the second axis, the first rotational direction opposite the second rotational direction.

5. The method of claim 4, wherein the roller is coupled to a platform of a turntable, wherein the platform of the turntable rotates relative to a base of the turntable about a third axis to align with a rotation of the wheel about a fourth axis, the third axis parallel to the fourth axis, the third axis and the fourth axis perpendicular to the first axis and the second axis.

6. The method of claim 4, further comprising:
transmitting the one or more simulation inputs to the chassis dynamometer; and synchronizing rotation of one or more elements of the chassis dynamometer with the application of torque by the vehicle based on the one or more simulation inputs.

7. The method of claim 4, further comprising:
receiving one or more navigation controls from the vehicle, the one or more navigation controls corresponding to the application of torque by the vehicle;
transmitting the one or more navigation controls to the chassis dynamometer; and synchronizing rotation of one or more elements of the chassis dynamometer with the application of torque by the vehicle based on the one or more navigation controls.

8. The method of claim 1, wherein the vehicle control mechanism of the controlled testing environment includes a lift that lifts the vehicle above the ground, wherein the stationary controlled area is on top of the lift, wherein the lift keeps the vehicle within the stationary controlled area during the test despite the application of torque by the vehicle by preventing wheels of the vehicle from touching the ground.

9. The method of claim 1, wherein the one or more simulation inputs include simulated sensor data corresponding to a particular sensor of the vehicle.

10. The method of claim 1, wherein the one or more simulation inputs include a representation of the simulated scene based on one or more types of data.

11. The method of claim 10, wherein the one or more types of data include visual data.

12. The method of claim 10, wherein the one or more types of data include distance measurement data.

13. The method of claim 1, further comprising determining that the path is an optimal path, wherein the calibration information supports calibration of the navigation system of the vehicle by encouraging navigation corresponding to the path in a situation matching to the simulated scene.

14. The method of claim 1, further comprising determining that the path is a suboptimal path, wherein the calibration information supports calibration of the navigation system of the vehicle by discouraging navigation corresponding to the path in a situation matching to the simulated scene.

15. The method of claim 1, further comprising:
generating a second set of one or more simulation inputs corresponding to the simulated scene based on the torque applied by the vehicle;
transmitting the second set of one or more simulation inputs to the vehicle during the test; and
determining that the vehicle has applied a second torque during the test in response to the transmission of the second set of one or more simulation inputs to the vehicle, wherein the path of the vehicle within the simulated scene is determined based on the torque and the second torque.

16. A system for vehicle testing, the system comprising:
a controlled testing environment that receives a vehicle within a stationary controlled area, wherein the controlled testing environment includes a vehicle control mechanism that keeps the vehicle within the stationary controlled area during a test despite application of torque by the vehicle during the test;

a communication interface;
a memory storing instructions; and
a processor that executes the instructions, wherein execution of the instructions by the processor causes the processor to:
generate one or more simulation inputs corresponding to a simulated scene, transmit, using the communication interface, the one or more simulation inputs to the vehicle during the test,
determine that the vehicle has applied the torque during the test in response to the transmission of the one or more simulation inputs to the vehicle,
determine a path of the vehicle within the simulated scene based on the torque applied by the vehicle during the simulated scene, and
transmit, using the communication interface, calibration information based on the path to the vehicle to support calibration of a navigation system of the vehicle based on the calibration information.

17. The system of claim 16, wherein the vehicle control mechanism of the controlled testing environment includes a motorized treadmill, wherein the stationary controlled area is on top of a surface the motorized treadmill, wherein the motorized treadmill keeps the vehicle within the stationary controlled area during the test despite the application of torque by the vehicle by moving the surface of the motorized treadmill to counteract propulsion of the vehicle through the application of the torque.

18. The system of claim 16, wherein the vehicle control mechanism of the controlled testing environment includes a chassis dynamometer, wherein the stationary controlled area is on top of the chassis dynamometer, wherein the chassis dynamometer keeps the vehicle within the stationary controlled area during the test despite the application of torque by the vehicle by rotating one or more cylinders of the chassis dynamometer to counteract propulsion of the vehicle through the application of the torque.

19. The system of claim 16, wherein the vehicle control mechanism of the controlled testing environment includes a lift that lifts the vehicle above the ground, wherein the stationary controlled area is on top of the lift, wherein the lift keeps the vehicle within the stationary controlled area during the test despite the application of torque by the vehicle by preventing wheels of the vehicle from touching the ground.

20. A method of vehicle testing, the method comprising:
propelling the vehicle into a stationary controlled area of a controlled testing environment, wherein at least one part of the vehicle is in physical contact with at least one part of a vehicle control mechanism of the controlled testing environment while the vehicle is within the stationary controlled area;
receiving one or more simulation inputs corresponding to a simulated scene at the vehicle during a test;
applying torque at the vehicle during the test in response to receipt of the one or more simulation inputs, wherein the vehicle control mechanism keeps the vehicle within the stationary controlled area during the test despite the application of torque by the vehicle;
receiving calibration information at the vehicle, the calibration information based on a path of the vehicle within the simulated scene as determined based on the torque applied by the vehicle during the simulated scene; and
calibrating a navigation system of the vehicle based on the calibration information.

* * * * *